US011419272B2

(12) United States Patent
Horst et al.

(10) Patent No.: US 11,419,272 B2
(45) Date of Patent: Aug. 23, 2022

(54) APPARATUS FOR INLINE AND INDIVIDUAL BALE WRAPPING OF HAY BALES

(71) Applicant: Tube-Line Manufacturing Ltd., Elmira (CA)

(72) Inventors: Paul Horst, Elmira (CA); Jake Friesen, Listowel (CA); Ross Martin, Elmira (CA)

(73) Assignee: Tube-Line Manufacturing Ltd., Elmira (CA)

( * ) Notice: Subject to any disclaimer, the term of this patent is extended or adjusted under 35 U.S.C. 154(b) by 0 days.

(21) Appl. No.: 16/607,325

(22) PCT Filed: Jul. 5, 2019

(86) PCT No.: PCT/CA2019/050929
§ 371 (c)(1),
(2) Date: Oct. 22, 2019

(87) PCT Pub. No.: WO2020/010443
PCT Pub. Date: Jan. 16, 2020

(65) Prior Publication Data
US 2021/0400879 A1 Dec. 30, 2021

Related U.S. Application Data

(60) Provisional application No. 62/697,615, filed on Jul. 13, 2018.

(51) Int. Cl.
*A01F 15/07* (2006.01)
*A01F 15/10* (2006.01)

(52) U.S. Cl.
CPC .......... *A01F 15/071* (2013.01); *A01F 15/106* (2013.01); *A01F 2015/0725* (2013.01); *A01F 2015/0755* (2013.01)

(58) Field of Classification Search
CPC .... A01F 15/071; A01F 15/141; A01F 15/106; A01F 15/0825; A01F 15/0833;
(Continued)

(56) References Cited

U.S. PATENT DOCUMENTS 4,730,436 A * 3/1988 Angelino ................ B65B 11/58
53/170
5,012,631 A 5/1991 Hostetler et al.
(Continued)

FOREIGN PATENT DOCUMENTS

CA 2270101 A1 10/2000
CA 2270146 A1 10/2000
(Continued)

OTHER PUBLICATIONS

International Search Report and Written Opinion dated Sep. 19, 2019 in related International Patent Application No. PCT/CA2019/050929 (11 pages).
(Continued)

*Primary Examiner* — Chelsea E Stinson
*Assistant Examiner* — Scott A Howell
(74) *Attorney, Agent, or Firm* — Bereskin & Parr LLP

(57) ABSTRACT

A bale wrapping apparatus for both inline and individual bale wrapping is described herein. The bale wrapping apparatus includes a bale wrapping mechanism configured to carry a plastic film around a bale when the bale is positioned in a bale wrapping space of the bale wrapping mechanism. The bale wrapping mechanism includes at least one movable tine that is configured to extend into the bale wrapping space to support the bale in the bale wrapping space when the bale wrapping apparatus is configured for inline bale wrapping and is movable out of the bale wrapping space when the bale wrapping apparatus is configured for individual bale wrapping. The bale wrapping apparatus also includes two pow-
(Continued)

ered rollers for supporting and rotating the bale in the bale wrapping space during individual bale wrapping. The two powered rollers are movable to configure the bale wrapping apparatus for inline bale wrapping.

21 Claims, 9 Drawing Sheets

(58) Field of Classification Search
CPC .............. A01F 15/0875; A01F 15/0883; A01F 2015/0755; A01F 2015/0725; A01F 2025/142
See application file for complete search history.

(56) References Cited

U.S. PATENT DOCUMENTS

| | | | |
|---|---|---|---|
| 5,152,125 A | 10/1992 | Laver | |
| 6,070,400 A * | 6/2000 | Peeters | A01F 15/071 53/588 |
| 6,082,076 A * | 7/2000 | Anderson | A01F 15/071 53/176 |
| 6,089,003 A | 7/2000 | Frey | |
| 6,341,470 B1 * | 1/2002 | Lacey | A01F 15/071 53/176 |
| 6,722,110 B1 | 4/2004 | Royneberg | |
| 9,374,946 B2 * | 6/2016 | D'Amours | A01F 25/14 |
| 11,219,166 B2 * | 1/2022 | Desrochers | B65B 11/008 |
| 2007/0081878 A1 * | 4/2007 | McHale | A01F 15/07 414/24.5 |
| 2008/0264031 A1 | 10/2008 | McHale et al. | |
| 2012/0180430 A1 * | 7/2012 | Lavoie | A01F 25/14 53/203 |
| 2015/0245563 A1 * | 9/2015 | Heaney | A01F 15/071 53/52 |
| 2020/0000042 A1 * | 1/2020 | Desrochers | A01F 15/071 |

FOREIGN PATENT DOCUMENTS

| | | | |
|---|---|---|---|
| EP | 1903851 A1 | 4/2008 | |
| FR | 2770371 A1 | 5/1999 | |
| GB | 2394932 A * | 5/2004 | ........... A01F 15/071 |
| GB | 2394932 A | 5/2004 | |
| WO | 9307059 A1 | 4/1993 | |
| WO | 9427423 A1 | 12/1994 | |
| WO | 2012131664 A1 | 10/2012 | |
| WO | 2013124836 A1 | 8/2013 | |
| WO | 2014030150 A2 | 2/2014 | |
| WO | 2017111632 A1 | 6/2017 | |

OTHER PUBLICATIONS

Tube-Line 6500X2 Owner's Manual. Tube-Line Manufacturing Inc., 2007 (80 pages).

* cited by examiner

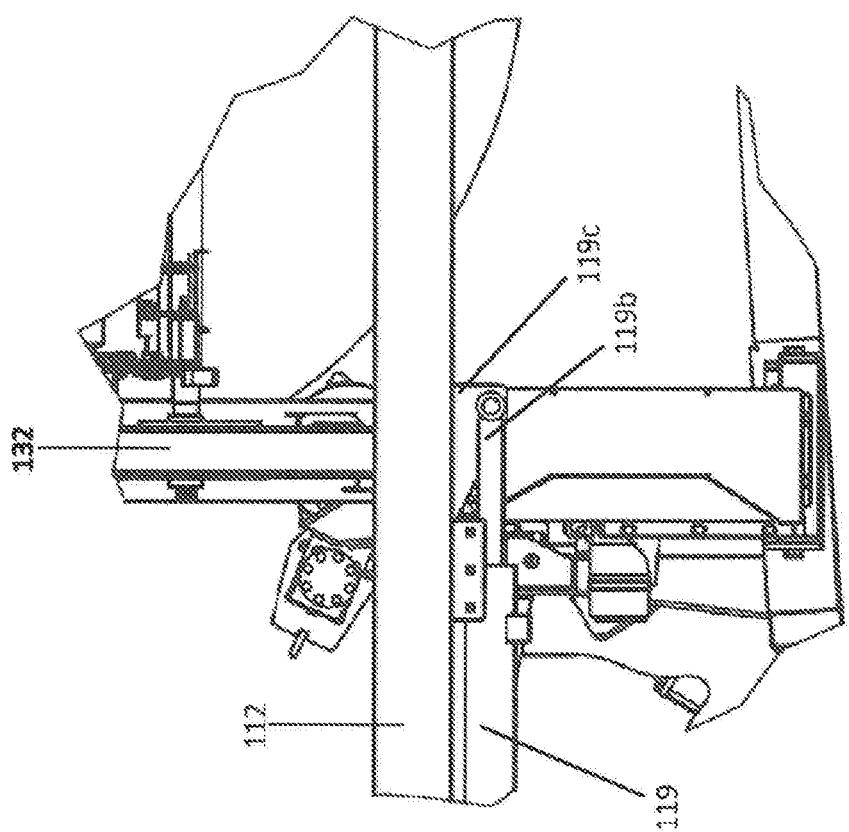

APPARATUS FOR INLINE AND INDIVIDUAL BALE WRAPPING OF HAY BALES

TECHNICAL FIELD

The embodiments disclosed herein relate to a bale wrapping apparatus, and, in particular to an apparatus for inline and individual bale wrapping of hay bales.

BACKGROUND

Baling of forage crops such as hay has traditionally been used to preserve these crops to feed livestock when needed, such as during the winter or other non-growing seasons or when adequate grazing resources are not otherwise available. Typically bales are formed in large cylindrical rolls and secured using twine.

Bale wrappers can be used to wrap bales in plastic to further preserve crops to feed livestock when needed. Large cylindrical bales can be wrapped individually or end-to-end in a line (also known as inline bale wrapping).

Individually wrapped bales are easy to transport but require a greater amount of plastic film to wrap all sides of the bale than bales that are wrapped end-to-end in a line. Conversely, bales that are wrapped end-to-end in a line require comparatively less plastic and are therefore quicker to wrap than individually wrapped bales, however individually wrapped bales cannot be transported until they are removed from their wrapping.

Current bale wrapping machines are designed for individual bale wrapping or inline bale wrapping, but not both. As a result, farmers have to choose between purchasing one of these machines or both machines, one for inline bale wrapping and one for individual bale wrapping.

Accordingly, there is a need for a bale wrapping apparatus capable of both inline bale wrapping and individual bale wrapping.

SUMMARY

According to one aspect, there is provided a bale wrapping apparatus for both inline and individual bale wrapping. The bale wrapping apparatus includes a bale wrapping mechanism configured to carry a plastic film around a bale when the bale is positioned in a bale wrapping space of the bale wrapping mechanism. The bale wrapping mechanism includes at least one movable tine that is configured to extend into the bale wrapping space to support the bale in the bale wrapping space when the bale wrapping apparatus is configured for inline bale wrapping and is movable out of the bale wrapping space when the bale wrapping apparatus is configured for individual bale wrapping. The bale wrapping apparatus also includes a pair of powered rollers for supporting and rotating the bale in the bale wrapping space during individual bale wrapping. The pair of powered rollers are movable to configure the bale wrapping apparatus for inline bale wrapping.

The bale wrapping apparatus may comprise two movable tines that extend into the bale wrapping space when the bale wrapping apparatus is configured for inline bale wrapping and are movable out of the bale wrapping space when the bale wrapping apparatus is configured for individual bale wrapping.

The tines may be pivotally coupled to the bale receiving support and pivot to move out of the bale wrapping space when the bale wrapping apparatus is configured for individual bale wrapping.

Each of the tines may be pivotally coupled to the bale receiving support and pivot inwardly to move out of the bale wrapping space when the bale wrapping apparatus is configured for individual bale wrapping.

The tines may extend a length of the bale wrapping space towards the inclined support The tines may extend beyond a length of the bale wrapping space towards the inclined support.

The tines may have a circular cross-section as they extend into the bale wrapping space.

The tines may have a circular cross-section and narrow to a point as they extend into the bale wrapping space.

The outer surface of the tines may have a smooth portion to provide for the plastic film to slide along the tines.

The pair of powered rollers may include a first powered roller positioned forward of the bale wrapping mechanism and a second powered roller positioned rearward of the bale wrapping mechanism.

The first powered roller may be movable between a first position below a top surface of the bale receiving support and a second position extending upwardly beyond the top surface of the bale receiving support.

The second powered roller may be movable between a first position below a top surface of the inclined support and a second position extending upwardly beyond the top surface of the inclined support.

The first powered roller may be positioned outside of the bale wrapping space when in the second position.

The second powered roller may be positioned outside of the bale wrapping space when in the second position.

The first powered roller may be pivotally mounted to the chassis.

The second powered roller may be pivotally mounted to the chassis.

Other aspects and features will become apparent, to those ordinarily skilled in the art, upon review of the following description of some exemplary embodiments.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 6A is a partial side view of the bale wrapping apparatus shown in FIG. 6.

Figure 1:
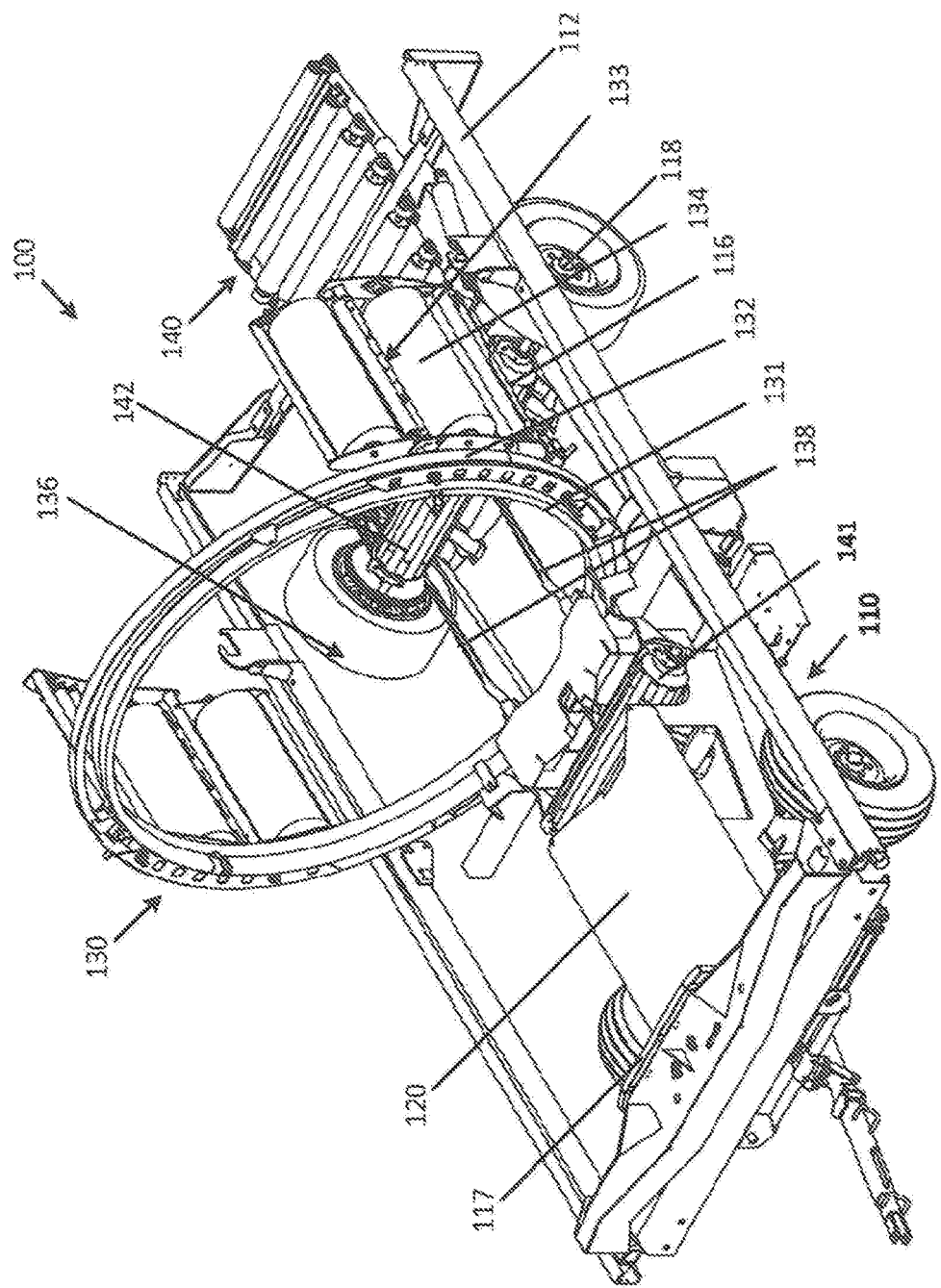
FIG. 1 is a front perspective view of a bale wrapping apparatus in an inline wrapping configuration, according to one embodiment.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Furthermore, it is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that as used herein, the wording "and/or" is intended to represent an inclusive - or. That is, "X and/or Y" is intended to mean X or Y or both, for example. As a further example, "X, Y, and/or Z" is intended to mean X or Y or Z or any combination thereof.

In spite of the technologies that have been developed, there remains a need in the field for improvements in the development of bale wrapping apparatuses for inline and individual bale wrapping.

Figure 2:
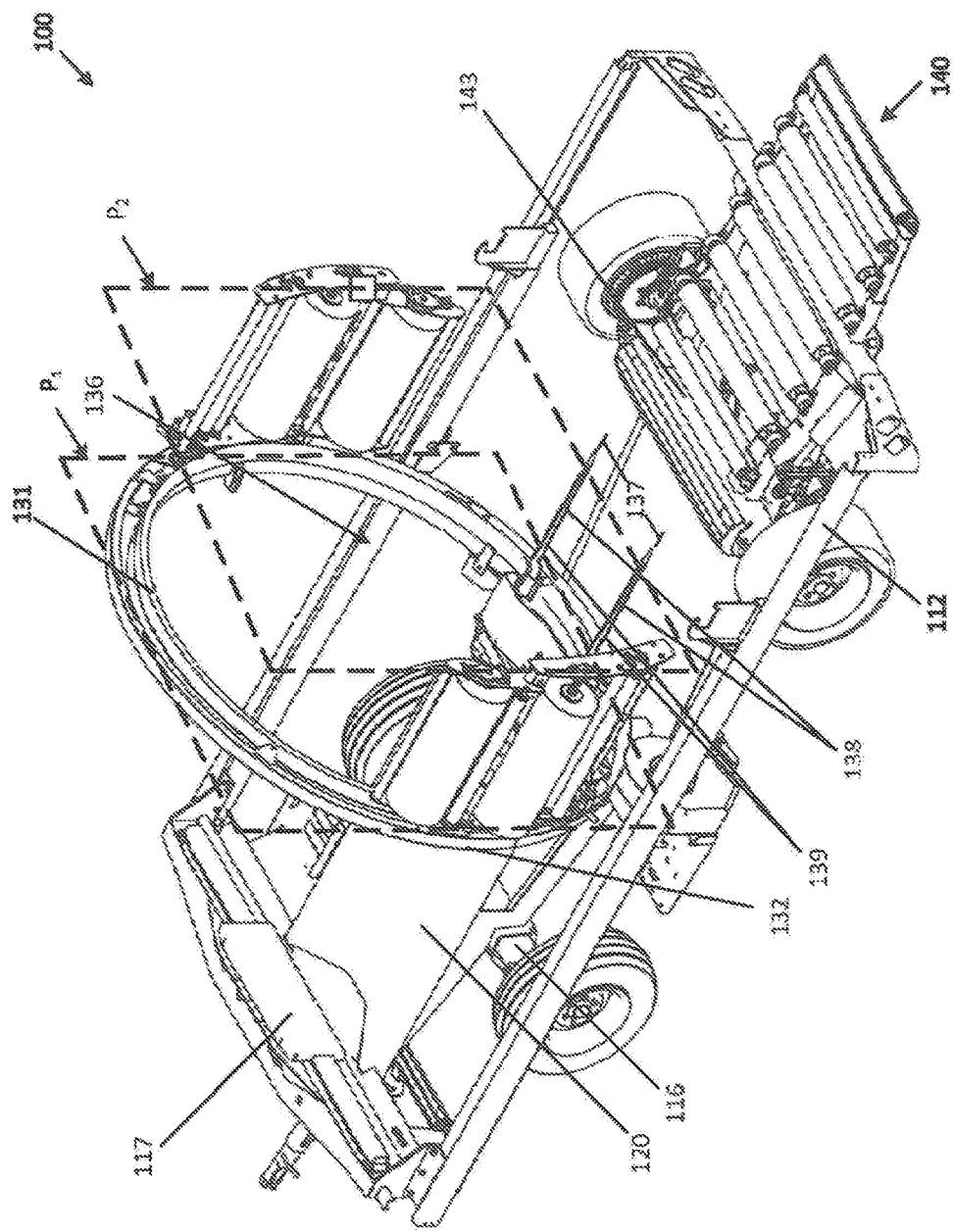
FIG. 2 is a rear perspective view of the bale wrapping apparatus shown in FIG. 1 in the inline wrapping configuration.
Figure 3:
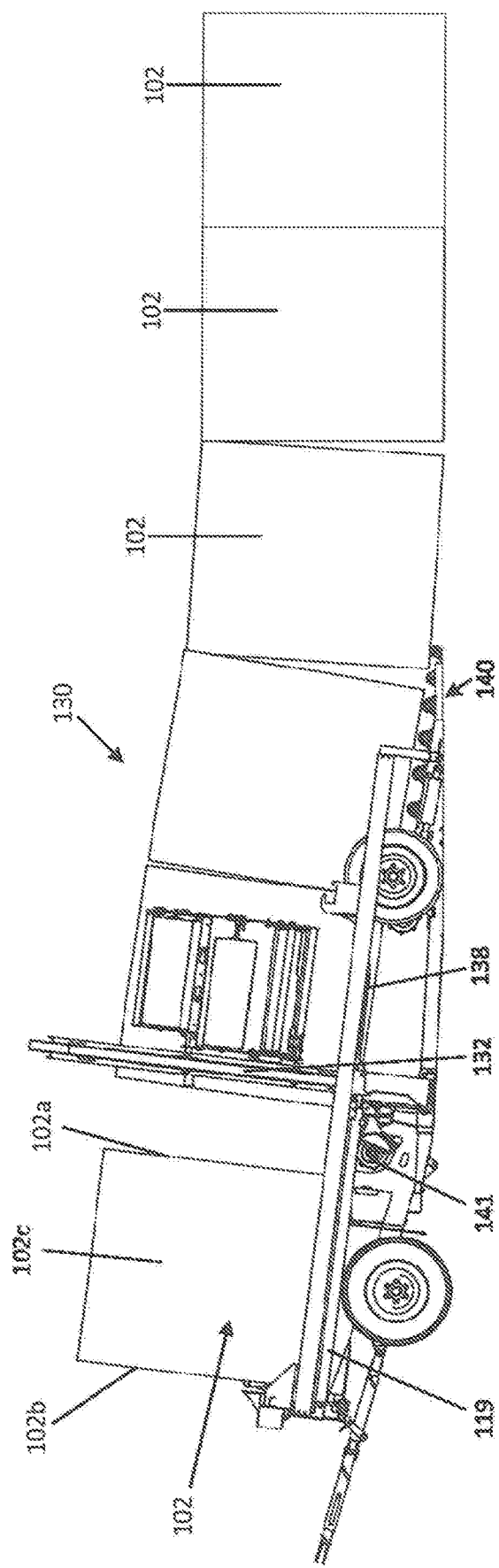
FIG. 3 is a side view of the bale wrapping apparatus shown in FIG. 1 in the inline wrapping configuration as the bale wrapping apparatus is wrapping bales end-to-end.
Figure 4:
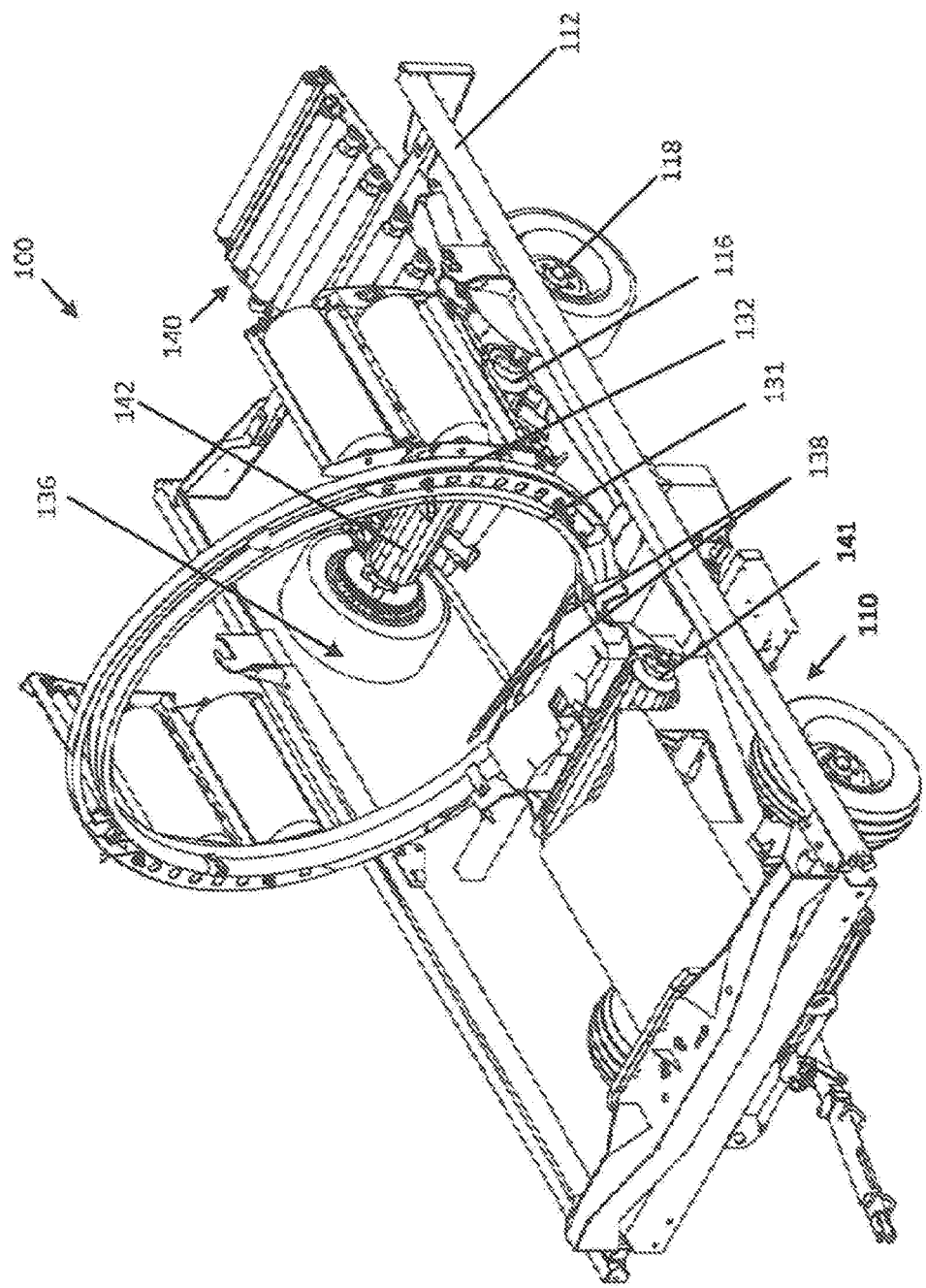
FIG. 4 is a front perspective view of the bale wrapping apparatus shown in FIG. 1 transitioning from the inline wrapping configuration to an individual wrapping configuration.

Referring to FIG. 1, illustrated therein is a front perspective view of a bale wrapping apparatus for inline bale wrapping and individual bale wrapping. Bale wrapping apparatus 100 includes a rolling chassis 110, a bale receiving support 120, a bale wrapping mechanism 130, an inclined support 140 and a pair of powered rollers, forward powered roller 141 and rearward powered roller 142. Bale wrapping apparatus 100 can transition between an inline configuration for wrapping bales end-to-end and an individual configuration for wrapping individual bales. In FIGS. 1 to 3, bale wrapping apparatus 100 is shown in the inline configuration. In FIGS. 4 to 8, bale wrapping apparatus 100 is shown in the individual configuration.

Rolling chassis 110 includes a frame 112 mounted on an undercarriage 114. Rolling chassis 110 is configured to move along a ground surface during bale wrapping when the bale wrapping apparatus 100 is in the inline configuration. In the embodiment shown in the figures, undercarriage 114 include two axles 116 spaced apart, each axel having a wheel 118 rotationally coupled on either end of the axle extending towards each side of the frame 112. In the inline wrapping configuration, rolling chassis 110 is configured to drive forward as the bale wrapping mechanism 130 wraps a bale 102, as described below. As rolling chassis 110 drives forward, bale 102 passes through the bale wrapping mechanism 130 (and bale wrapping space 136) and is simultaneously wrapped. In the individual wrapping configuration, rolling chassis 110 may be stationary.

Bale wrapping apparatus 100 includes a receiving support 120 for receiving a bale 102 and supporting the bale 102 above a ground surface. Bale receiving support 120 is adjacent to the bale wrapping mechanism 130. Bales 102 supported by receiving support 120 are generally translated into the bale wrapping mechanism 130 along the bale receiving support 120 by a powered ram 115 of the rolling chassis 110.

Powered ram 115 includes a cross member 117 and a pair of hydraulic cylinders 119 (see FIG. 3) extending along the sides of the bale receiving support 120. The cross member 117 is supported across the pair of cylinders 119, and is moved by the cylinders 119 between a bale receiving position for receiving a bale and a bale pushing position for pushing the bale towards the bale wrapping mechanism 130. In the embodiment shown in the figures, the cylinders 119 are provided in such a way that the cross member 117 is positioned at the bale receiving position when the cylinders 119 are extended, and the cross member 117 is positioned at a bale pushing position when the cylinders are retracted. Cross member 117 slidingly engages frame 112 to slide transversely relative to frame 112 when pushing a bale from the bale receiving support 120 towards the bale wrapping mechanism 130.

Bale wrapping mechanism 130 is located between the bale receiving support 120 and the inclined support 140. Bale wrapping mechanism 130 includes a fixed inner hoop 131 and a rotating outer hoop 132 that generally surrounds and is coplanar with the fixed inner hoop 131. The rotating hoop 130 is rotatably supported by the fixed hoop 131, which is provided on the frame 112 of apparatus 100. As shown, fixed inner hoop 131 has a circular shape and the rotating outer hoop 132 has a circular shape. In at least one embodiment, the fixed inner hoop has an inner diameter of about 88.5 inches. Rotating outer hoop 132 and fixed inner hoop 131 may have different shapes and may be located in different arrangements. Also, rotating outer hoop 132 may be supported by one or more fixed supports provided on the frame 112.

Bale wrapping mechanism 130 carries plastic film 134 around a bale when the bale is at least partially positioned in a bale wrapping space 136 via carriages 133 that carry one or more rolls of plastic film 134. As the rotating outer hoop 132 rotates about the fixed inner hoop 131, plastic film 134 is carried around each bale.

In some embodiments, outer rotating hoop 132 is rotated about its axis by a rotating driver (not shown). Generally, rotation of outer rotating hoop 132 is synchronized with movement of the powered ram 115 to provide for consistent wrapping of bales as they are translated through the inner and outer hoops 131, 132, respectively, and through the bale space 136. Rotation of rotating outer hoop 132 may be stopped when a bale passing through the bale wrapping space 136 is completely or partially wrapped. The rotational speed of rotating outer hoop 132 may be varied to adjust the amount of overlap of plastic film 134 on wrapped bales.

Carriages 133 are fixedly coupled to rotating outer hoop 132 and rotate about the bale wrapping space 136 to wrap a bale 102 in plastic film 134 when at least a portion of the bale 102 is in the bale wrapping space 136. Bale wrapping space 136 is defined by a path of the carriages 133 as they rotate around the bale 102. For instance, in the embodiments shown in the drawings, the bale wrapping space 136 extends rearwardly from the first plane $P_1$ between the carriages 133 to a second plane $P_2$ that is parallel with the first plane $P_1$ and spaced apart from the first plane $P_1$ by a distance equaling the length of the carriages 133. Accordingly, when the fixed inner hoop 131 and the rotating outer hoop 132 are circular, as shown in the embodiments shown in the figures, bale wrapping space 136 generally has a shape of a circular cylinder extending between the first and second planes $P_1$ and $P_2$, respectively.

Any form of plastic film 134 may be used in the apparatus described herein provided that it is suitable for wrapping bales. A roll of plastic film may be conveniently used. In some embodiments, a stretchable plastic film is used to provide tension to the plastic film during wrapping so that bales are tightly wrapped.

Referring now to FIG. 3, during an inline wrapping process of wrapping multiple bales end-to-end in a row, each bale 102 is received by the receiving support 120 so that a flat end 102a of the bale 102 faces the bale wrapping mechanism 130. Each bale 102 is moved towards the bale wrapping mechanism 130 and through the fixed and rotating hoops 131, 132, respectively, into the bale wrapping space 136 by the powered ram 115 (described further below with respect to FIG. 6A).

When apparatus 100 is configured for inline bale wrapping, bales 102 are supported in the bale space 136 by one or more tines 138. In the embodiments shown in the figures, two tines 138 are provided. In other embodiments, it may be preferable for three or four or more tines 138 to be provided for supporting a bale 102 in the bale space 136 during inline bale wrapping.

Tines 138 may be coupled to receiving support 120 or fixed inner hoop 131 and extend rearwardly towards the inclined support 140. In the embodiment shown in the figures, two tines 138 are provided laterally spaced apart from each other and each extends from the receiving support 120 into the bale space 136 towards the inclined support 140. In some embodiments, each tine 138 may be shorter than a length of the bale space 136 (e.g. a length of carriages 133) and therefore may extend partially into the bale space 136. In other embodiments, each tine 138 may be about the same length as bale space 136 (e.g. about the same length as carriages 133) and therefore extend through the bale space 136. In yet other embodiments, each tine 138 may be longer than the bale space 136 (e.g. longer than carriages 133) and therefore extend beyond the bale space 136. Tines 138 are generally separated by a spacing 137. Spacing 137 is configured to provide for the tines 138 to support a bale 102 in the bale space for inline wrapping. For instance, the tines 138 are separated by a spacing 137 that facilitates supporting a bale 102 at a height such that a lowermost portion of the bale 102 that is between the tines 138 is higher than a forward portion 143 of the inclined support 140 and/or the rearward powered roller 142. Similarly, the spacing 137 also provides for the tines 138 to support and/or stabilize the bale 102 in the bale space 136 (e.g. limiting movement of the bale 102) during wrapping.

Tines 138 may have any size or shape to provide for supporting bales 102 in the bale space 136. For instance, in the embodiments shown in the figures, tines 138 generally have an elongated or spear shape with a circular cross section. In some embodiments, tines 138 have a circular cross-section and narrow to a point as the tines 138 extend rearwardly towards inclined support 140.

After bales 102 are wrapped by the bale wrapping mechanism 130, they pass along the inclined support 140 to a ground surface. In the embodiments shown in the figures, when wrapped end-to-end as noted above, bales 102 are supported by tines 138 in the bale wrapping space 136. As an unwrapped bale 102 is pushed towards and into the bale wrapping space 136 by cross member 117 (via an adjacent bale 102), a wrapped bale 102 slides along the tines 138 towards the inclined support 140. Accordingly, tines 138 at least partially extend into the bale wrapping space 136 and abut a bale 102 supported thereon during inline bale wrapping. As each bale 102 is wrapped in plastic film 134 by the wrapping mechanism 130, the plastic film 134 surrounds the tines 138. Tines 138 are therefore spaced apart from each other by a distance to both support a bale 102 (e.g. and inhibit each bale 102 from rolling towards one of the sides of the apparatus 100 when in the bale wrapping space 136) while not impeding the wrapping of the bale 102 supported thereon. After a bale 102 is wrapped, the bale 102 slides off of the tines 138 towards the inclined support 140. In this manner, the tines 138 are sized and shaped to provide for plastic wrap abutting the tines 138 to slide along the length of the tines 138. In some embodiments, at least a portion of an outer surface of the tines 138 is smooth to provide for the plastic wrap 134 to slide along the outer surface of the tines 138 as each bale 102 is pushed towards the inclined support 140.

Figure 5:
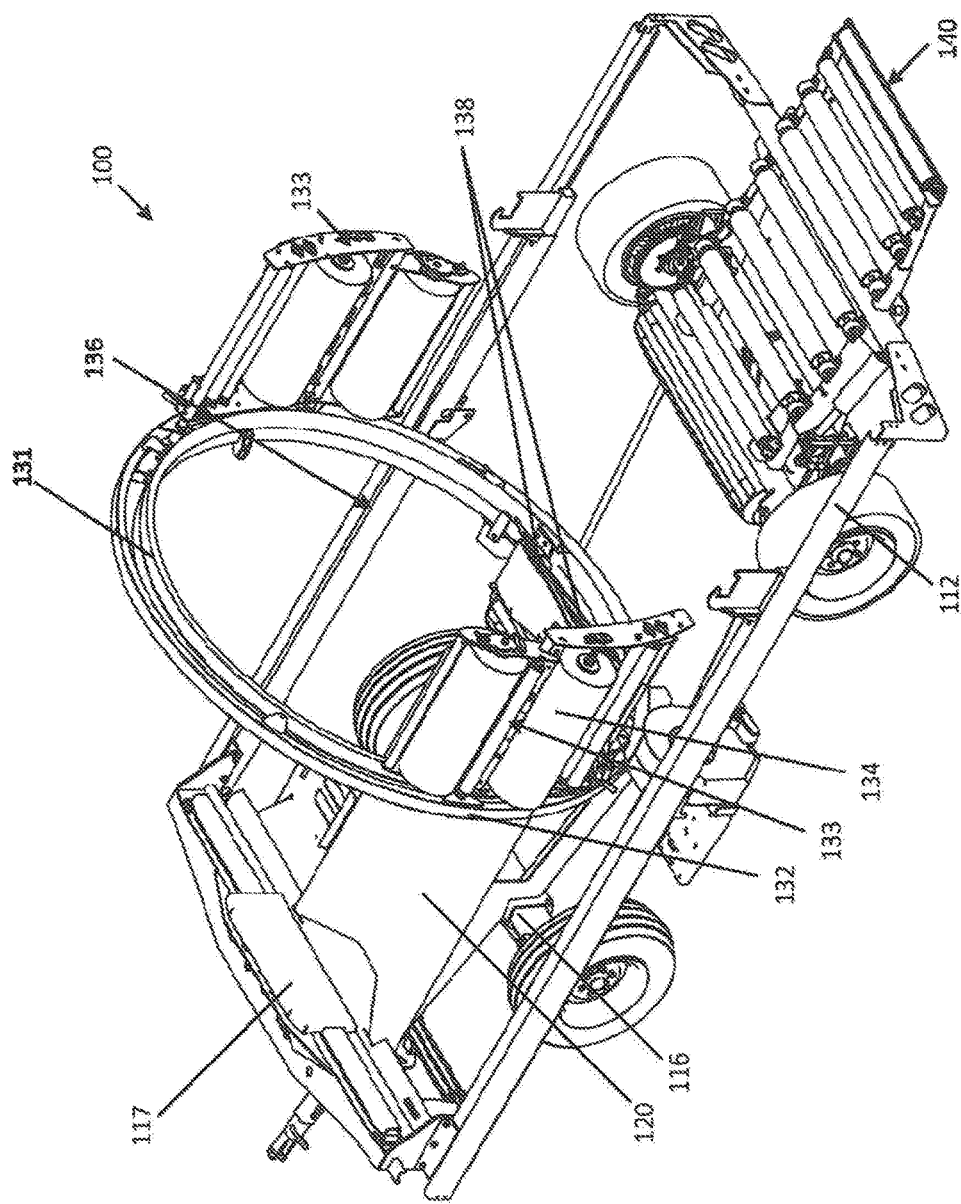
FIG. 5 is a rear perspective view of the bale wrapping apparatus shown in FIG. 1 transitioning from the inline wrapping configuration to the individual wrapping configuration.

In order to transition apparatus 100 from the inline wrapping configuration where bales 102 are wrapping end-to-end to form a row to the individual wrapping configuration where bales 102 are wrapped individually, tines 138 are configured to be movable between a first position where they extend into the bale space 136 for inline wrapping of bales 120 to a second position where do not extend into the bale space 136 for wrapping individual bales 102. For instance, referring to FIGS. 4 and 5, each tine 138 is pivotable between a first position where they extend into the bale space 136 for inline wrapping of bales 120 to a second position where do not extend into the bale space 136 for wrapping individual bales 102. In FIG. 5, each tine 138 is shown as having pivoted inwardly about a vertical axis perpendicular to a forward end 139 of each tine 138. Tines 138 may be movable in other directions or mechanisms to provide for tines 138 to move between a first position where they extend into the bale space 136 for inline wrapping of bales 120 to a second position where do not extend into the bale space 136 for wrapping individual bales 102. For instance, tines 138 may independently fold inwardly from the bale space 136 via a cylinder and linkage mechanism.

Figure 6:
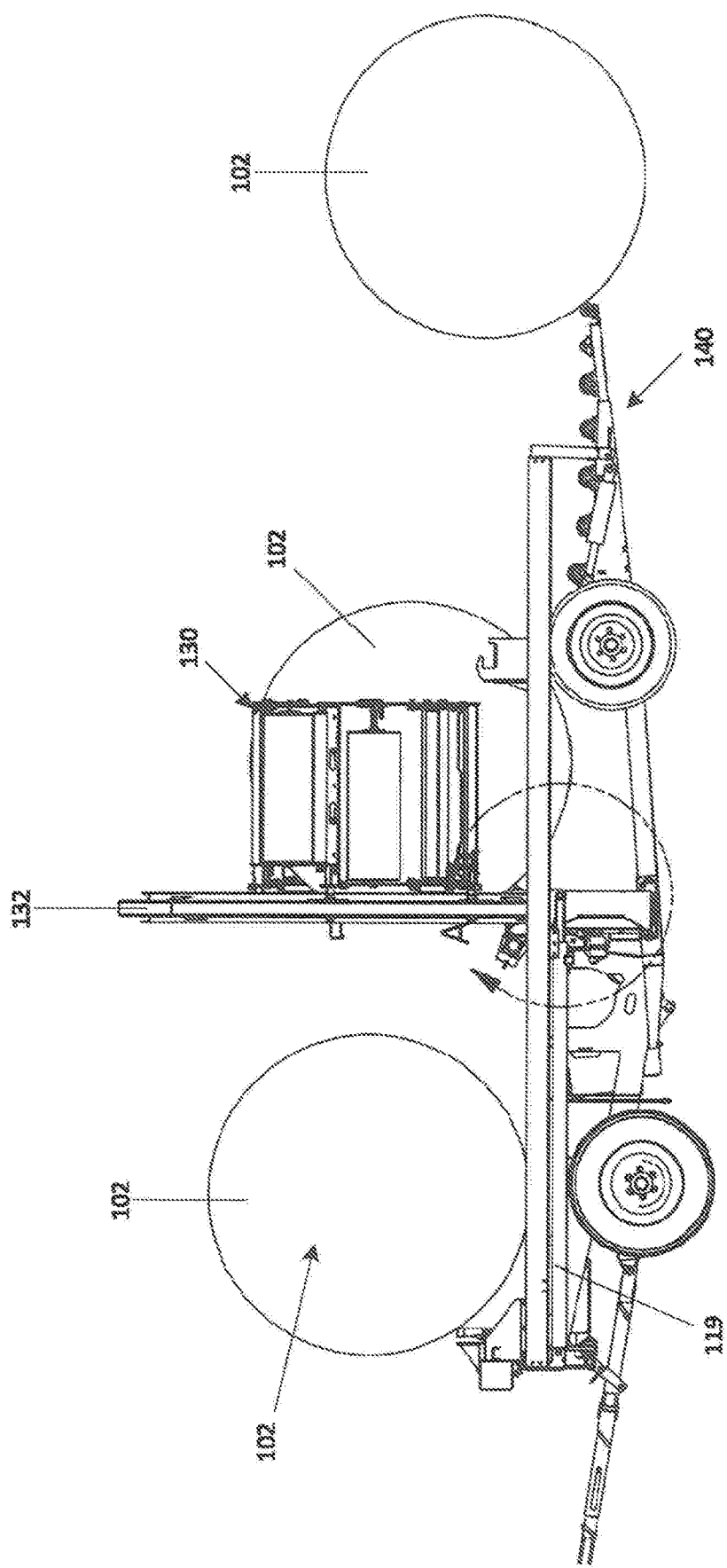
FIG. 6 is a side view of the bale wrapping apparatus shown in FIG. 1 in the individual wrapping configuration at a first stage of individually wrapping a bale.

Referring now to FIG. 6, when the apparatus 100 is configured for wrapping bales individually, each bale 102 is received by the bale receiving support 110 in a horizontal position so that a flat end 102a of the bale 102 faces a side of the apparatus 100. In the example of wrapping circular bales, this means that a curved portion of the bale 102 faces the bale wrapping apparatus 130. Again, the bale 102 is pushed towards the bale wrapping mechanism 130 and the bale wrapping space 136 by the powered ram 115.

More specifically, referring to FIG. 6A, a piston rod 119b of each of the cylinders 119 of the powered ram 115 slidingly engages a track (not shown) of the frame 112 via a coupling member 119c that is configured to slide rearwardly with respect to the frame 112 as each piston rod 119b is pushed out of its respective hydraulic cylinder 119. Each piston rod 119b is coupled to an opposite end of the cross member 117 such that rearward movement of the piston rods 119b out of the cylinder 119 causes rearward movement of the cross member 117. As the cross member 117 slides rearwardly with respect to the frame 112, it can engage a bale 102 that has been places on the bale receiving support 120 and push the bale 102 towards the bale wrapping mechanism 130 and the bale wrapping space 136.

Figure 7:
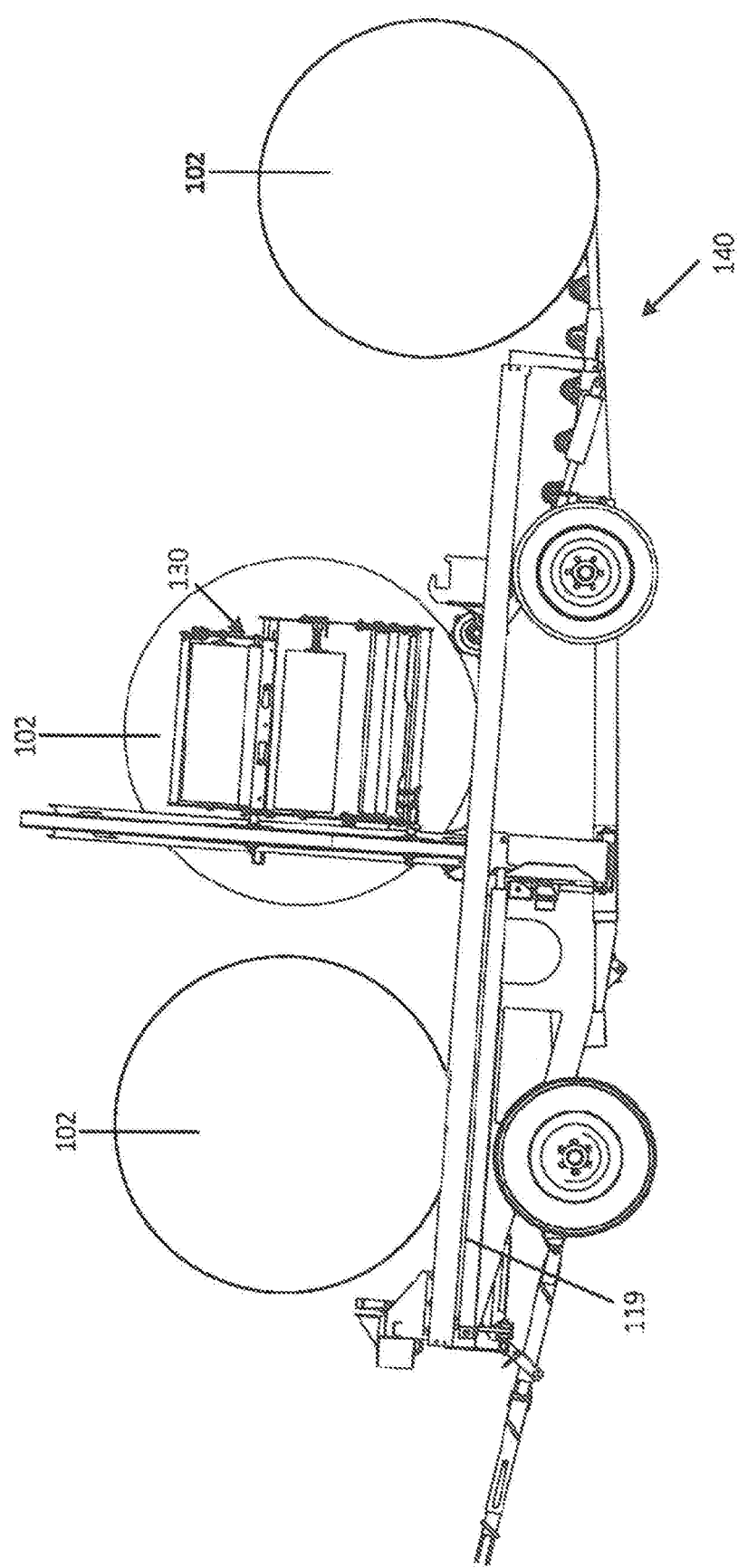
FIG. 7 is a side view of the bale wrapping apparatus shown in FIG. 1 in the individual wrapping configuration at a second stage of individually wrapping a bale.
Figure 8:
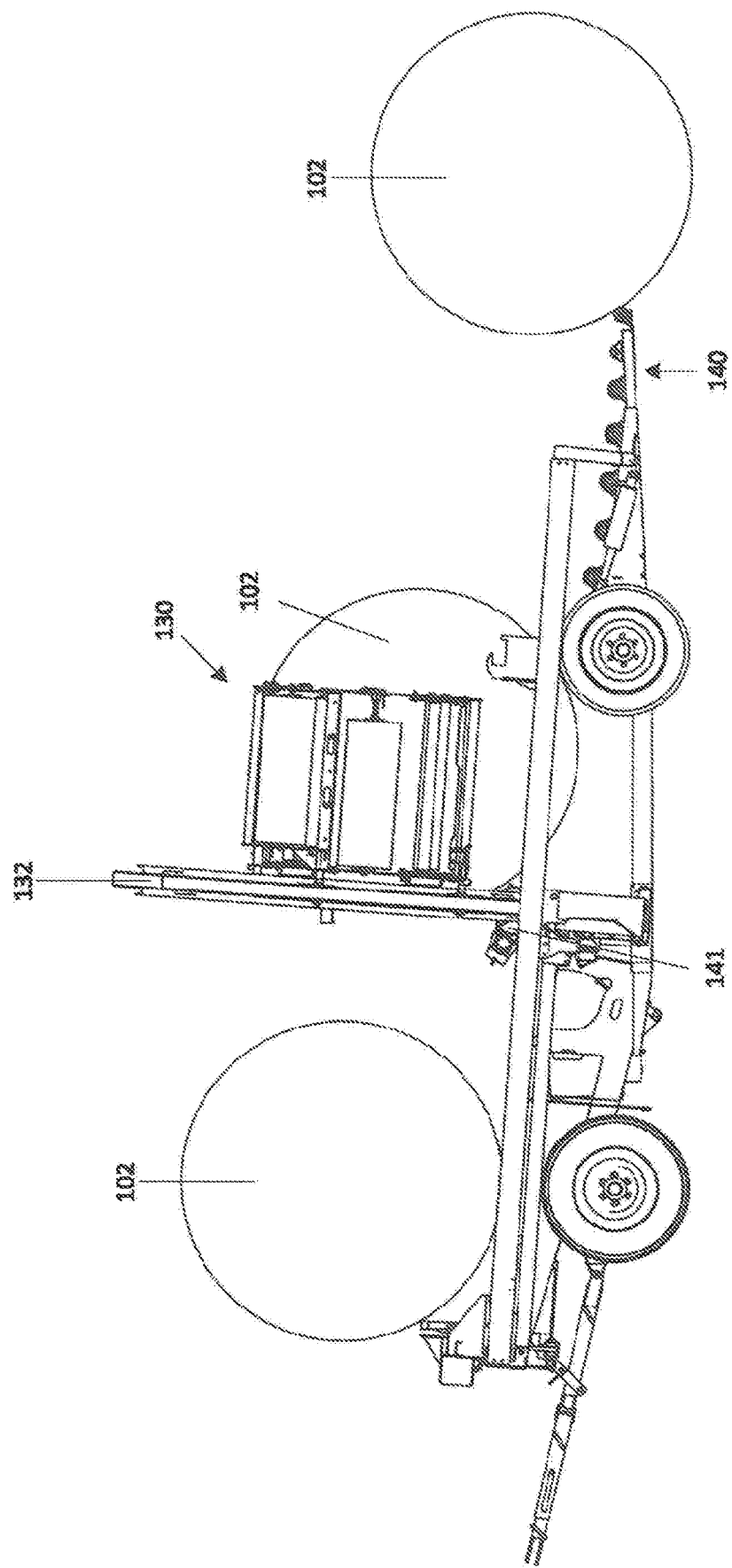
FIG. 8 is a side view of the bale wrapping apparatus shown in FIG. 1 in the individual wrapping configuration at a third stage of individually wrapping a bale.

Once at least a portion of the bale 102 enters the bale wrapping space 136, the bale 102 is wrapped vertically with plastic film 134. As shown in FIGS. 7 and 8, the bale 102 is pushed through the bale wrapping space 136 until a front part 102b of the bale 102 comes into contact with rearward roller 142.

Forward powered roller 141 is located at a rearward end of bale receiving support 120 forward of the bale wrapping mechanism 130 and the bale wrapping space 136. Rearward powered roller 142 is located at a forward end of inclined support 140 rearward of the bale wrapping mechanism 130 and the bale wrapping space 136. Forward powered roller 141 and rearward powered roller 142 are each configured to be independently movable between a first (e.g. lowered) position and a second (e.g. raised) position. For instance, forward powered roller 141 and rearward powered roller 142 may each be pivotally mounted to the chassis 110 to move between their respective first position and second position. In its first position, forward powered roller 141 is positioned substantially parallel to or below an upper surface of the bale receiving support 120. In its first position, rearward powered roller 142 is positioned substantially parallel to or below an upper surface of the inclined support 140. Forward powered roller 141 extends upwardly from the upper surface of the bale receiving support 120 in its second position and rearward roller 142 extends upwardly from the upper surface of the inclined support 140 in its second position.

When apparatus 100 is configured for individually wrapping a bale 102, each of forward powered roller 141 and rearward powered roller 142 support bale 102 in the bale wrapping space 136 and rotate the bale 102 to wrap the bale 102 with plastic film 134. For instance, the forward powered roller 141 and rearward powered roller 142 can rotate the bale 102 in a in the bale wrapping space 136 during the wrapping operation of the bale 102.

During individual wrapping, as the bale 102 passes from the receiving support 120 into the bale wrapping space 136, forward powered roller 141 is at its first position substantially parallel to or below the upper surface of the bale receiving support 120 and the rearward roller is at its second position extending upwardly from the upper surface of the inclined support 140 to engage the bale 102 (as shown in FIG. 6). As a bale 102 enters the bale wrapping space 136 and travels rearwardly towards the inclined support 140, the bale 102 passes over the forward powered roller 141 and engages the rearward powered roller 142.

Once the bale 102 has entered the bale wrapping space 136 and engaged the rearward powered roller 142, the forward powered roller 141 pivots upwardly to its second position where it extends above the upper surface of the receiving support 120 and engages and raises the bale 102 and supports the bale 102 in the bale wrapping space 136 (see FIG. 7).

During individual bale wrapping, the bale 102 is supported in the bale wrapping space 136 by both of the forward powered roller 141 and the rearward powered roller 142. As shown is FIG. 7, when the forward powered roller 141 extends upwardly from the upper surface of the bale receiving support 120 and the rearward powered roller 142 extends upwardly from the upper surface of the inclined support 140, the forward powered roller 141 and the rearward powered roller 142 are each respectively in their second positions outside of the bale wrapping space 136. In these second positions, the forward and rearward powered rollers 141, 142, respectively, are spaced apart by a distance sufficient to provide for the carriages 133 to pass underneath and/or around the bale 102 and between the forward and rearward powered rollers 141, 142 to wrap the bale 102 with plastic. Further, the second positions of each of the forward and rearward powered rollers 141, 142 are sufficient for providing a gap between the chassis 110 and the forward and rearward powered rollers 141, 142 for the carriages 133 to pass around the bale 102.

During individual bale wrapping, the forward and rearward powered rollers 141, 142 spin the bale 102 in place as the carriages 133 rotate around the bale 102 to provide for all surfaces of the bale to be wrapped in plastic film 134. In some embodiments, the bale 102 may be wrapped in more than one layer of plastic film 134 during individual bale wrapping. For instance, the bale 102 may be wrapped with between 5 and 10 layers of plastic film during individual bale wrapping.

After bale 102 has been wrapped, the rearward powered roller 142 pivots downwardly to its first position substantially parallel to or below the upper surface of the inclined support 140 and the forward roller 141 remains at its second position extending upwardly from the upper surface of the receiving support 120 (see FIG. 8). Movement of the rearward roller 142 to its second position generally provides for the wrapped bale 102 to pass from the bale wrapping space 136 to the inclined support 140 and subsequently to the ground surface. In some embodiments, wrapped bale 102 can move from the bale wrapping space 136 to the inclined support 140 by gravity. In other embodiments, upon the rearward roller 142 pivoting to its first position, the forward roller 141 can spin to rotate the bale 102 to push it towards the inclined support 140.

After a bale 102 has passed from the bale wrapping space 136 towards the inclined support 140, the forward powered roller 141 returns to its first position and the second powered roller returns to its second position to receive a subsequent bale from the bale receiving support 120.

While the applicant's teachings described herein are in conjunction with various embodiments for illustrative purposes, it is not intended that the applicants teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A bale wrapping apparatus for both inline and individual bale wrapping, the bale wrapping apparatus comprising:
    a rolling chassis configured to move along a ground surface during inline bale wrapping;
    a bale receiving support coupled to the chassis for supporting a bale above the ground surface;
    a bale wrapping mechanism coupled to the chassis rearward of the bale receiving support, the bale wrapping mechanism configured to carry a plastic film around the bale when the bale is positioned in a bale wrapping space of the bale wrapping mechanism;
    a pair of powered rollers configured to support the bale in the bale wrapping space and rotate the bale in the bale wrapping space during individual bale wrapping;
    an inclined support coupled to the chassis rearward of the bale wrapping mechanism to transport a wrapped bale from the bale wrapping space to a ground surface; and
    a powered ram coupled to the chassis for advancing the bale from the bale receiving support into the bale wrapping space;
    wherein the bale wrapping mechanism comprises two movable tines that extend into the bale wrapping space to support the bale in the bale wrapping space when the bale wrapping apparatus is configured for inline bale wrapping and is movable out of the bale wrapping space when the bale wrapping apparatus is configured for individual bale wrapping, each of the tines being pivotally coupled to the bale receiving support and configured to pivot to move out of the bale wrapping space when the bale wrapping apparatus is configured for individual bale wrapping.

2. The bale wrapping apparatus of claim 1, wherein each of the tines is pivotally coupled to the bale receiving support and pivots inwardly to move out of the bale wrapping space when the bale wrapping apparatus is configured for individual bale wrapping.

3. The bale wrapping apparatus of claim 1, wherein the tines extend a length of the bale wrapping space towards the inclined support.

4. The bale wrapping apparatus of claim 1, wherein the tines extend beyond a length of the bale wrapping space towards the inclined support.

5. The bale wrapping apparatus of claims 1, wherein the tines have a circular cross-section as they extend into the bale wrapping space.

6. The bale wrapping apparatus of claim 1, wherein the tines have a circular cross-section and narrow to a point as they extend into the bale wrapping space.

7. The bale wrapping apparatus of claim 1, wherein an outer surface of the tines has a smooth portion to provide for the plastic film to slide along the tines.

8. The bale wrapping apparatus of claim 1, wherein the pair of powered rollers comprises a first powered roller positioned forward of the bale wrapping mechanism and a second powered roller positioned rearward of the bale wrapping mechanism.

9. The bale wrapping apparatus of claim 8, wherein the first powered roller is movable between a first position below a top surface of the bale receiving support and a second position extending upwardly beyond the top surface of the bale receiving support.

10. The bale wrapping apparatus of claim 8, wherein the second powered roller is movable between a first position below a top surface of the inclined support and a second position extending upwardly beyond the top surface of the inclined support.

11. The bale wrapping apparatus of claim 9, wherein the first powered roller is positioned outside of the bale wrapping space when in the second position.

12. A bale wrapping apparatus for both inline and individual bale wrapping, the bale wrapping apparatus comprising:
    a rolling chassis configured to move along a ground surface during inline bale wrapping;
    a bale receiving support coupled to the chassis for supporting a bale above the ground surface;
    a bale wrapping mechanism coupled to the chassis rearward of the bale receiving support, the bale wrapping mechanism configured to carry a plastic film around the bale when the bale is positioned in a bale wrapping space of the bale wrapping mechanism;
    a pair of powered rollers configured to support the bale in the bale wrapping space and rotate the bale in the bale wrapping space during individual bale wrapping;
    an inclined support coupled to the chassis rearward of the bale wrapping mechanism to transport a wrapped bale from the bale wrapping space to a ground surface; and
    a powered ram coupled to the chassis for advancing the bale from the bale receiving support into the bale wrapping space;
    wherein the bale wrapping mechanism comprises at least one movable tine that is configured to extend into the bale wrapping space to support the bale in the bale wrapping space when the bale wrapping apparatus is configured for inline bale wrapping and is movable out of the bale wrapping space when the bale wrapping apparatus is configured for individual bale wrapping;
    wherein the pair of powered rollers comprises a first powered roller positioned forward of the bale wrapping mechanism and a second powered roller positioned rearward of the bale wrapping mechanism, the second powered roller being movable between a first position below a top surface of the inclined support and a second position extending upwardly beyond the top surface of the inclined support.

13. The bale wrapping apparatus of claim 8, wherein the first powered roller is pivotally mounted to the chassis.

14. The bale wrapping apparatus of claim 8, wherein the second powered roller is pivotally mounted to the chassis.

15. The bale wrapping apparatus of claim 1, wherein the pair of powered rollers comprises a first powered roller positioned forward of the bale wrapping mechanism and a second powered roller positioned rearward of the bale wrapping mechanism.

16. The bale wrapping apparatus of claim 15, wherein the first powered roller is movable between a first position below a top surface of the bale receiving support and a second position extending upwardly beyond the top surface of the bale receiving support.

17. The bale wrapping apparatus of claim 9, wherein the second powered roller is movable between a first position below a top surface of the inclined support and a second position extending upwardly beyond the top surface of the inclined support.

18. The bale wrapping apparatus of claim 1, wherein each of the tines is movably coupled to the bale receiving support.

19. The bale wrapping apparatus of claim 10, wherein the second powered roller is positioned outside of the bale wrapping space when in the second position.

20. A bale wrapping apparatus for both inline and individual bale wrapping, the bale wrapping apparatus comprising:
- a rolling chassis configured to move along a ground surface during inline bale wrapping;
- a bale receiving support coupled to the chassis for supporting a bale above the ground surface;
- a bale wrapping mechanism coupled to the chassis rearward of the bale receiving support, the bale wrapping mechanism configured to carry a plastic film around the bale when the bale is positioned in a bale wrapping space of the bale wrapping mechanism;
- a pair of powered rollers configured to support the bale in the bale wrapping space and rotate the bale in the bale wrapping space during individual bale wrapping;
- an inclined support coupled to the chassis rearward of the bale wrapping mechanism to transport a wrapped bale from the bale wrapping space to a ground surface; and
- a powered ram coupled to the chassis for advancing the bale from the bale receiving support into the bale wrapping space;
- wherein the bale wrapping mechanism comprises at least one movable tine that is configured to extend into the bale wrapping space to support the bale in the bale wrapping space when the bale wrapping apparatus is configured for inline bale wrapping and is movable out of the bale wrapping space when the bale wrapping apparatus is configured for individual bale wrapping;
- wherein the pair of powered rollers comprises a first powered roller positioned forward of the bale wrapping mechanism and a second powered roller positioned rearward of the bale wrapping mechanism, the second powered roller being movable between a first position below a top surface of the inclined support and a second position extending upwardly beyond the top surface of the inclined support; and
- wherein the second powered roller is pivotally mounted to the chassis.

21. A bale wrapping apparatus for both inline and individual bale wrapping, the bale wrapping apparatus comprising:
- a rolling chassis configured to move along a ground surface during inline bale wrapping;
- a bale receiving support coupled to the chassis for supporting a bale above the ground surface;
- a bale wrapping mechanism coupled to the chassis rearward of the bale receiving support, the bale wrapping mechanism configured to carry a plastic film around the bale when the bale is positioned in a bale wrapping space of the bale wrapping mechanism;
- a pair of powered rollers configured to support the bale in the bale wrapping space and rotate the bale in the bale wrapping space during individual bale wrapping;
- an inclined support coupled to the chassis rearward of the bale wrapping mechanism to transport a wrapped bale from the bale wrapping space to a ground surface; and
- a powered ram coupled to the chassis for advancing the bale from the bale receiving support into the bale wrapping space;
- wherein the bale wrapping mechanism comprises at least one movable tine that is configured to extend into the bale wrapping space to support the bale in the bale wrapping space when the bale wrapping apparatus is configured for inline bale wrapping and is movable out of the bale wrapping space when the bale wrapping apparatus is configured for individual bale wrapping; and
- wherein the pair of powered rollers comprises a first powered roller positioned forward of the bale wrapping mechanism and a second powered roller positioned rearward of the bale wrapping mechanism, the first powered roller being movable between a first position below a top surface of the bale receiving support and a second position extending upwardly beyond the top surface of the bale receiving support, and the second powered roller being movable between a first position below a top surface of the inclined support and a second position extending upwardly beyond the top surface of the inclined support.

* * * * *